B. A. BURNS.
ATTACHMENT FOR VEHICLE HEADLIGHTS.
APPLICATION FILED MAR. 19, 1917.
1,260,322.
Patented Mar. 26, 1918.
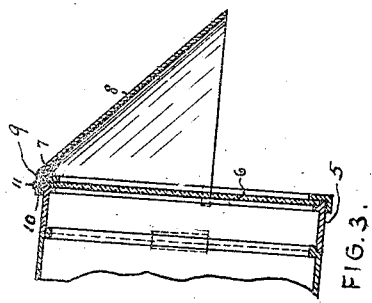
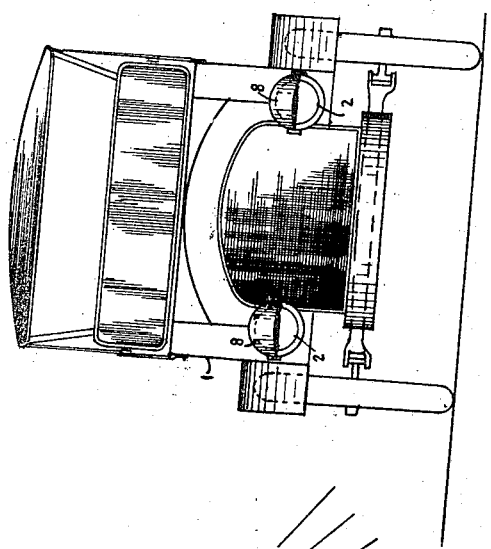
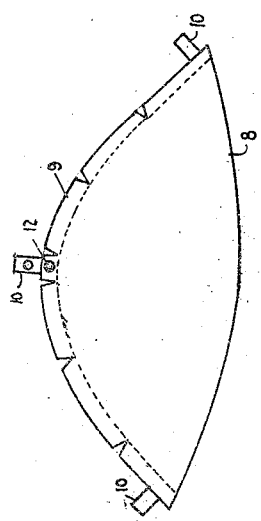
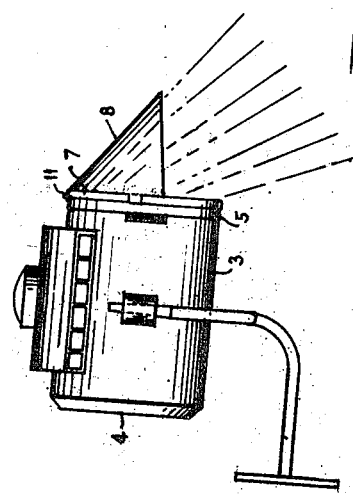
INVENTOR.
Bessie A. Burns.
BY
ATTORNEYS.

UNITED STATES PATENT OFFICE.

BESSIE A. BURNS, OF HOUSTON, TEXAS.

ATTACHMENT FOR VEHICLE-HEADLIGHTS.

1,260,322.  Specification of Letters Patent.  Patented Mar. 26, 1918.

Application filed March 19, 1917. Serial No. 155,875.

*To all whom it may concern:*

Be it known that I, Mrs. BESSIE A. BURNS, a citizen of the United States, residing at Houston, in the county of Harris and State of Texas, have invented certain new and useful Improvements in Attachments for Vehicle-Headlights, of which the following is a specification.

This invention relates to new and useful improvements in attachments for vehicle head lights and more particularly such head lights as are adapted for use on automobiles.

The object of the invention is to provide a deflecting hood for the head light which will deflect the rays of light downwardly below the line of vision of those in front of the light, particularly those in automobiles approaching the light.

A further feature of the invention resides in the provision of a head light of the character described having a deflecting hood provided with a reflecting under surface which will reflect the rays of light so as to throw them on each side of and immediately in front of the automobile, to give abundance of light on the roadway around and in front of the vehicle.

A still further feature of the invention resides in the provision of a device of the character described which will be cheaply and easily constructed and easily applied to, or detached from any conventional form of head light. With the above and other objects in view, the invention has particular relation to certain novel features of construction, arrangement of parts and use, an example of which is given in this specification and illustrated in the accompanying drawings, wherein:—

Figure 1 is a front view of an automobile showing the head light equipped with my improved attachment, Fig. 2 shows a side view of the head light, Fig. 3 shows a fragmentary vertical sectional view, and Fig. 4 shows a diagrammatic view of the deflecting hood.

Referring now more particularly to the drawings wherein like numerals of reference designate similar parts in each of the figures, the numeral 1 refers to an automobile having the head lights 2, 2. Each head light consists of a metallic casing 3 having its rear end closed at 4 and provided with the usual reflector and lamp, which being of the usual construction it is not deemed necessary to show or describe. Each head light is equipped with a door 5 consisting of a metallic frame and a glass 6 held therein by means of a rim 7 which fits closely over the door frame. The numeral 8 designates a deflector which is hood-like in form and which is attached to the upper part of the door 5 and declines forwardly therefrom so that its free edge will come below the ordinary line of vision of those in front of the head light. This hood is usually formed of sheet metal and its adjacent edge 9 fits closely against the upper part of the rim 7 and is held thereto by means of the lugs 10, integral with the hood and folded back under said hood so as to engage over the edges of the rim 7 and fit between it and the door frame so as to hold the hood firmly in position relative to the door 5. A set screw 11 is provided which is threaded through a tapped hole 12 which passes through the top part of the hood and through the rim 7 the central lug 10 and the door frame, said set screw being provided to secure the hood against accidental displacement and also providing an easy means for removing the hood from the head light in case it is desired to remove same. The under side of the hood is formed into a reflector so as to reflect the rays of light upon the roadway on each side of and in front of the car, said hood thus throwing a bright light on the roadway but deflecting the rays downwardly below the ordinary line of vision.

What I claim is:

1. The combination with a head light having a rim fitted over the front part of the casing to secure the protecting glass in position, of a hood-like deflector whose adjacent edge fits closely against the upper part of said rim, lugs integral with the deflector and turned back to engage over the edge of said rim, said lugs fitting between the rim and door frame, the top part of the hood and the corresponding lug being provided with alined orifices and a set screw passing through said orifices and through the door frame to secure said deflector to said rim.

2. The combination with a head light having a rim fitted over the front part of the casing, of a head light deflector fitted against the upper part of said rim, a plurality of lugs integral with the deflector and overturned to engage over the rear edge of the rim and to fit between said rim and casing, one of said lugs and the corresponding part of the hood being provided with alined orifices, and means passing through said orifices and through the door frame to secure the deflector to the rim.

In testimony whereof I have signed my name to this specification in the presence of two subscribing witnesses.

BESSIE A. BURNS.

Witnesses:
E. V. HARDWAY,
FLORENCE JOHNSTON.